(12) United States Patent
Brown et al.

(10) Patent No.: US 9,783,140 B2
(45) Date of Patent: Oct. 10, 2017

(54) METHOD AND APPARATUS FOR REMOTE FUEL REFILL LEVEL MONITORING

(75) Inventors: Gregory P. Brown, Dearborn, MI (US);
Brian Thomas Aitken, Livonia, MI (US); Phillip M. Pierron, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 13/616,950

(22) Filed: Sep. 14, 2012

(65) Prior Publication Data

US 2014/0077936 A1 Mar. 20, 2014

(51) Int. Cl.
*H04Q 5/22* (2006.01)
*B60R 16/023* (2006.01)
*H04W 4/00* (2009.01)
*H04W 4/20* (2009.01)
*H04L 29/08* (2006.01)

(52) U.S. Cl.
CPC .......... *B60R 16/0232* (2013.01); *H04L 67/12* (2013.01); *H04W 4/008* (2013.01); *H04W 4/206* (2013.01)

(58) Field of Classification Search
CPC ..... Y02T 90/16; Y02T 90/14; Y02T 10/7088; Y02T 90/12; Y02T 10/7005; B60L 2200/26; B60L 11/1824; B60L 2250/30; G01R 31/3689; H04Q 9/00; B60R 16/0232; H04L 67/12; H04W 4/008; H04W 4/206
USPC ...................... 320/109; 705/18, 17; 235/375; 340/10.1–10.5, 540, 686.6
See application file for complete search history.

(56) References Cited

U.S. PATENT DOCUMENTS

| | | | |
|---|---|---|---|
| 3,570,644 A * | 3/1971 | Booth | 194/206 |
| 4,354,620 A * | 10/1982 | Tsuneda | B67D 7/14 |
| | | | 222/14 |
| 6,630,813 B2 | 10/2003 | Berels et al. | |
| 2003/0182033 A1* | 9/2003 | Underdahl et al. | 701/29 |
| 2009/0216688 A1* | 8/2009 | Kelty et al. | 705/418 |
| 2011/0057612 A1* | 3/2011 | Taguchi et al. | 320/109 |
| 2011/0215941 A1* | 9/2011 | Iozzo | 340/686.6 |
| 2012/0086395 A1* | 4/2012 | Kim et al. | 320/109 |
| 2012/0259723 A1* | 10/2012 | Ansari | B60L 11/1844 |
| | | | 705/26.3 |
| 2012/0293122 A1* | 11/2012 | Murawaka | B60L 11/1816 |
| | | | 320/109 |
| 2013/0110632 A1* | 5/2013 | Theurer et al. | 705/14.58 |
| 2014/0055232 A1* | 2/2014 | Yoshizawa | G07C 9/00896 |
| | | | 340/5.7 |

OTHER PUBLICATIONS

Geek.com, OnStar Embraces the Future Via Smartphone App Services—Cell Phones & Mobile Devices, Jul. 23, 2010.

* cited by examiner

*Primary Examiner* — Ojiako Nwugo
(74) *Attorney, Agent, or Firm* — Jennifer Stec; Brooks Kushman P.C.

(57) ABSTRACT

A system includes a processor configured to receive requests from a wireless device in wireless communication with the processor, the requests corresponding to one or more aspects of a refueling process. The processor is also configured to collect vehicle data corresponding to the one or more aspects of the refueling process and respond to the requests by sending the data relating to the one or more aspects of the refueling process.

13 Claims, 4 Drawing Sheets

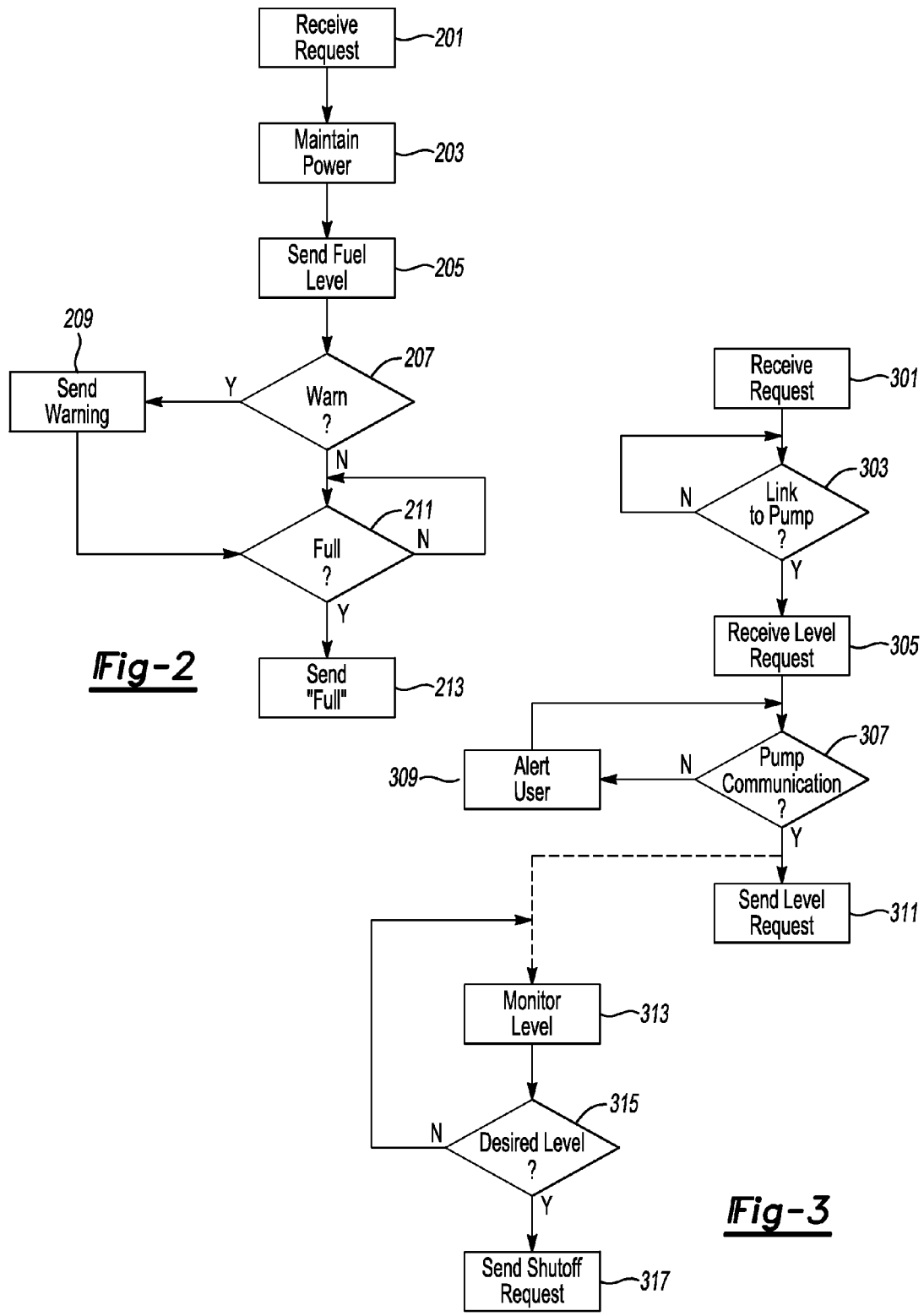

METHOD AND APPARATUS FOR REMOTE FUEL REFILL LEVEL MONITORING

TECHNICAL FIELD

The illustrative embodiments generally relate to methods and apparatuses for remote fuel refill level monitoring.

BACKGROUND

Whether a car is fueled by electricity or gasoline, owners will periodically stop at refueling points to refuel/recharge the fuel in the vehicle (fuel/refuel, as used herein, refers to both electric power and gasoline, as well as any other fuel useable to power a vehicle). Electric vehicles, for example, may take some number of minutes to fully charge, and an owner may not wish to stand directly next to the vehicle during recharging to monitor fuel levels.

U.S. Application 2011/0057612 generally relates to a communication part of a battery charge state transmission device of a charging device acquires charge state information of each external charge vehicle. A station communication part transmits the charge state information to an information management station device. The charge state information is grouped for transmission so that the number of transmissions, the amount of communication traffic and the cost of communication with the management station device, and the operation load of the management station device are reduced.

U.S. Pat. No. 6,630,813 generally relates to a system for an automotive vehicle has a temperature sensor generating a temperature signal indicative of the temperature outside the vehicle and a battery. A battery controller is coupled to the temperature sensor and the battery. The controller monitors a state of charge of the battery, monitors a temperature outside of the vehicle and compares the state of charge to a predetermined state of charge. The predetermined state of charge is a function of the temperature. The controller generates an indicator when the state of charge reaches the predetermined state of charge.

SUMMARY

In a first illustrative embodiment, a system includes a processor configured to receive requests from a wireless device in wireless communication with the processor, the requests corresponding to one or more aspects of a refueling process. The processor is also configured to collect vehicle data corresponding to the one or more aspects of the refueling process and respond to the requests by sending the data relating to the one or more aspects of the refueling process.

In a second illustrative embodiment, a non-transitory computer-readable storage medium stores instructions that, when executed by a processor, cause the processor to perform the method including receiving requests from a wireless device in wireless communication with the processor, the requests corresponding to one or more aspects of a refueling process. The illustrative method also includes collecting vehicle data corresponding to the one or more aspects of the refueling process. Further, the illustrative method includes responding to the requests by sending the data relating to the one or more aspects of the refueling process.

In a third illustrative embodiment, a computer-implemented method includes receiving requests from a wireless device in wireless communication with a vehicle computing system (VCS) processor, the requests corresponding to one or more aspects of a refueling process. The illustrative method also includes collecting vehicle data corresponding to the one or more aspects of the refueling process. Further, the method includes responding to the requests by sending the data relating to the one or more aspects of the refueling process.

BRIEF DESCRIPTION OF THE DRAWINGS

FIG. 2 shows an illustrative example of a fuel level reporting system;

FIG. 3 shows an illustrative example of a fuel level reporting and control system;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
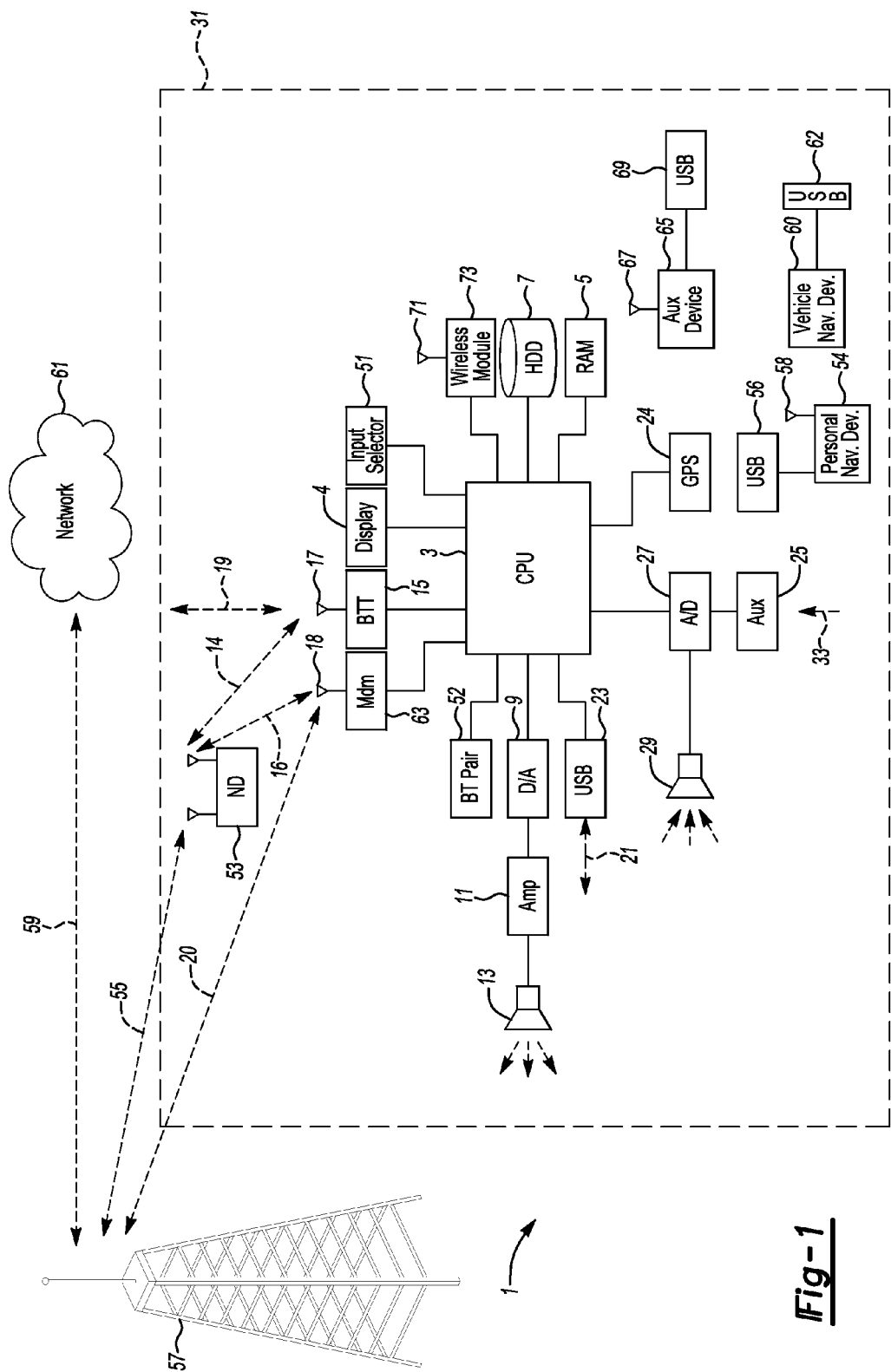
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Vehicle operators refueling vehicles may wish to know what the current fuel level of a vehicle is without having to power a vehicle and/or check the instrument panel fuel indication gauge. In some instances, customers wishing to behave in a "green" manner may wish to stop fueling after a first "click" (i.e., automatic pump shutoff). While this will typically result in a full or almost full tank, there are instances where the shutoff can occur when the tank is less than 95% full.

In cases such as the above, a customer may find it troublesome to power a vehicle, check an instrument panel, evaluate a fuel level and then decide whether or not to continue fueling a vehicle. Plus, if the customer has already placed the pump back in the holster, then the option to continue fueling may require a re-swipe of a credit card, re-entry of a pin, etc.

The illustrative embodiments propose some systems and methods that make it easier to detect a current fuel level. Further, if a customer is away from a vehicle, the applications may give some degree of control over the refueling process.

FIG. 2 shows an illustrative example of a fuel level reporting system. In this illustrative example, the reporting can be done from a vehicle computing system (VCS) to a wireless device carried by the operator. This device can include, but is not limited to, a wireless phone, PDA, smartphone, tablet PC, etc. Data reported from the VCS can be handled by an application (app) running on the wireless device and presented to the user in a clean and legible manner.

The process shown in FIG. 2 runs on the vehicle computing system, although one of skill in the art will understand that at least some portions of this process could be handled by the wireless device or a cloud based system. In the example shown in FIG. 2, a user has launched or is running an application on a portable device which will request a fuel level, or, in an alternative example, the process on the VCS is aware that such an application may be accessed.

In this example, the application requests a fuel level from the VCS, which receives the request from the application 201. Since some measure of power will be needed to transmit data to and from the application, it is possible that the VCS will be powered for some period of time, at least in a limited capacity, following the key-off of a vehicle. Once the request has been received, the VCS can maintain an appropriate level of power (using, for example, a vehicle battery) to handle any further actions that need to be taken with respect to the request 203.

Since the request was for a current fuel level, in this illustrative example, the VCS will retrieve fuel level information from the appropriate vehicle sensor and/or BUS. The information can then be sent to the requesting application/device 205. In certain instances, it may be desirable to provide a warning to a driver, such as, for example, a pre-set fuel level being approached.

In the examples below, the option to disable fueling from the device will be discussed, but in many current real-world situations the technology to implement this solution may not yet have been installed in a fuel station. Accordingly, the application may have an ability to set a fullness, cost, drivable distance, etc. If a current fuel level is at or nearing that level 207, the system may send a warning to a driver 209, informing the driver to shut down a pump. This can be useful, for example, if a driver is away from a vehicle, inside a vehicle (in cold weather), or otherwise not looking directly at a fuel pump. Further, with regards to drivable distance and similar variables, viewing the pump will not give the driver an estimate of the actual drivable distance based on a current vehicle fuel level.

If there is no warning, the system may continue to report until the vehicle has reached a full fuel level 211. Once the vehicle's fuel level has reached a full state 211, the process may send a "full" signal to the requesting application.

FIG. 3 shows an illustrative example of a fuel level reporting and control system. In this illustrative example, the process running in the VCS may again receive a request from a remote application for data relating to current fuel levels 301. Further, in this embodiment, it is contemplated that there may be some form of linkage to a fuel pump that is created through the use of, for example, without limitation, wiFi, Bluetooth or other wireless communication medium. This connection could exist between a wireless device and the pump, a vehicle and the pump, or all three.

In this example, the process checks to see if such a connection is available 303. Having such a connection can provide several features. For example, cost data and fuel pumped could be transmitted to the vehicle for phone transmission, or directly to a phone. Similarly, commands from a vehicle (shut off pump, slow pump, slow charge, shut off charge, etc.) or wireless device could be relayed to the pump for wireless control over the pump (note, as stated before, pump is also synonymous with plug for electric vehicles).

If there is not a link to the pump, in this embodiment, the process may default to a system where commands are not passed to the pump or provided as an option, such as shown in FIG. 2. If the connection is available, the process will then, in this embodiment, receive a request for a level at which to cease pumping 305. In this example, the level could be a specific gallon amount or charge, or could be more general (e.g., without limitation 50%/75%/100% etc.). Additionally or alternatively, the request could be in the form of travelable distance—e.g., shut off the pump when the travelable distance is over 100 miles.

One the request has been received, the process again checks to ensure that communication with the pump is still established 307. As previously stated, although communication here is between a vehicle and the pump, the application could potentially communicate directly with the pump. Although not described in great detail herein, it is considered that the physical pump or plug could be outfitted with some form of contact relay to ensure that commands from a vehicle coming in wirelessly were, in fact, from the same vehicle to which the pump is currently connected. This could be accomplished through a variety of methods not described in detail herein. Nor are these methods limited to physical communication confirmation, a user could, for example, key in a pin or other code to correlate a pump to a vehicle and/or a wireless device.

In this example, if the pump is not connected and available for wireless instruction, the vehicle computing system may warn the user 309. This warning can be useful because it allows the user to realize that, for example, a shut-off command may not have been enacted. It can also help prevent overfueling and avoid a bad user experience when too much fuel is provided.

If the pump is connected and control is available, the process may send a command to the pump to shut off at a certain level 311. Actually, in this embodiment, it is unlikely that the pump knows the actual fuel level of the vehicle. Accordingly, the process will monitor the fuel level 313 and, when the appropriate level is reached 315, the shutoff command can be sent 317. In another embodiment, if, for example, a total amount of dispensed fuel or total cost was requested, the pump could receive the request from the vehicle and be in charge of the cutoff at that level.

Figure 4:
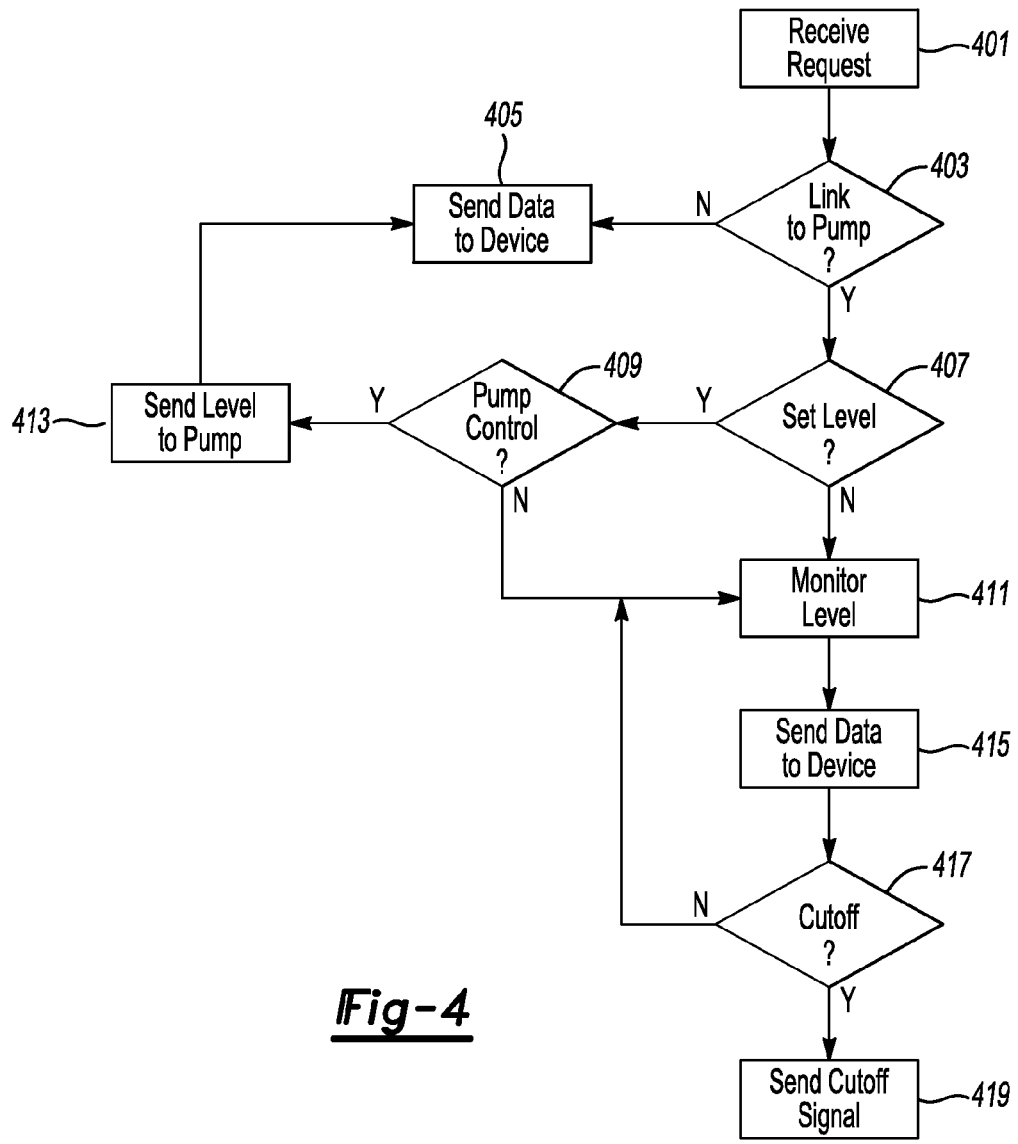
FIG. 4 shows a second illustrative example of a fuel level reporting and control system.

FIG. 4 shows a second illustrative example of a fuel level reporting and control system. Again, in this illustrative embodiment, the process will be interacting with a pump which may or may not have control available thereto through use of the vehicle computing system. In this example, the process may first receive (or, for example, a request to control some aspect of the refueling) 401.

The process first determines if a control-link to the pump is available 403. If such a link is not available, the reporting may have to be done through the vehicle computing system, and control features of the application may not be available. Accordingly, if such a link is not available, the process may simply send any requested data to the device 405.

If some form of control is available over the pump, the process may determine if a request for a fuel stop level (e.g., without limitation, fuel level, cost, distance, etc.) is present as part of the request 407. If such a request is present, the process may either send the request to the pump 413 (if the variable cutoff point relates to a pump-tracked factor) or control the refueling process and request shutoff at the appropriate point (if the variable cutoff point relates to a vehicle-tracked factor). At the same time, data relating to the refueling can still be sent to the device for viewing by the user 405.

If there is no specific cutoff specified, the process can monitor a fuel level 411 and send the data relating to that fuel level to the device 415. Since, in this portion of the process, the pump has been confirmed as controllable, different actions can be taken based upon receipt and processing of this data. For example, the user, upon seeing that a desired fuel level or cost (relayed, for example, from the pump) had been reach or was being approached, could request a shutoff or slowdown of refueling 417, which could be relayed to the pump 419. This process would then give the user some degree of dynamic control over the refueling process, even if the user was not present at the pump. For example, on a cold winter day, the user could sit inside a vehicle and dispense exactly the amount of fuel that was desired, without having to freeze outside to do so.

Figure 5A:
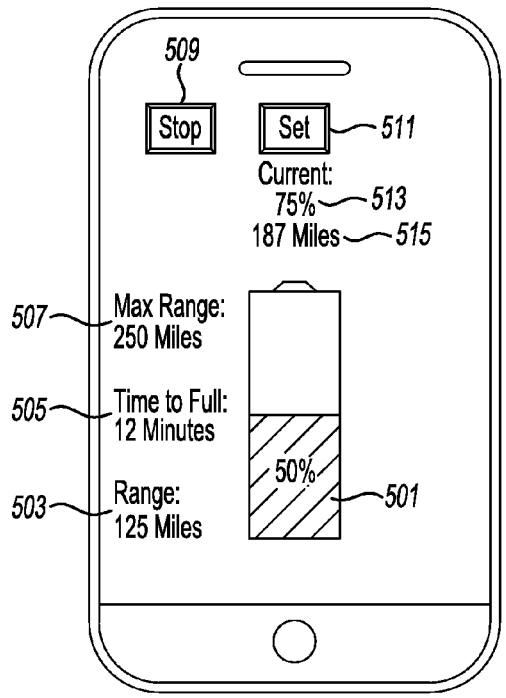
FIGS. 5A and 5B show illustrative examples of fuel level reporting application output.
Figure 5B:
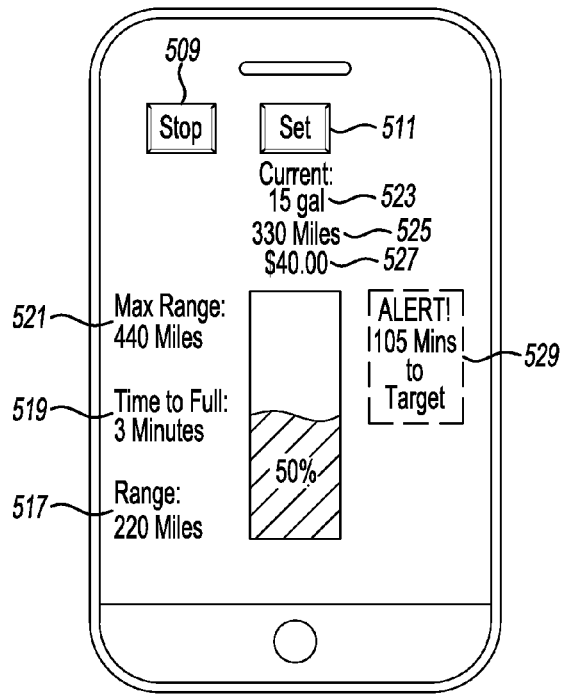

FIGS. 5A and 5B show illustrative examples of fuel level reporting application output. In this illustrative example, FIG. 5A shows some features that might be available on a smart phone for an electric vehicle, and FIG. 5B shows some features that might be available on a smart phone for a gasoline powered vehicle. Of course, hybrid vehicles and other suitably powered vehicles could also have reporting provided.

In this example, the sample phone in FIG. 5A shows a display of an application reporting electrical levels in a battery electric vehicle (BEV) or hybrid electric vehicle (HEV). In the center of the display, in this example, the application shows a recharge level representative of an overall state of vehicle charge 501. This gives a user a quick and easy way to gauge an overall state of recharge. If charging was ongoing, for example, this display could flash, display a charge symbol, or provide other suitable indicia of ongoing charging.

Also shown, in this example, is a current available range based on the current charge level 503. This estimated range can be based on vehicle specifications or, if the vehicle has been driven long enough that a more accurate determination of power usage for a given driver can be obtained, the range can be based on known range information for that particular operator (as defined, by example, based on a phone-to-operator correlation).

The illustrative display also shows an estimated time until the charge is full 505. This can be based on information received from a recharge point, or, for example, can be based on an observed recharge rate based on charging already obtained. A maximum range for the vehicle can also be shown 507, again based on either OEM spec data or based on observed driving behavior and maximum ranges based on previous full charges.

This illustrative example is also provided with a degree of user-interactivity. In this example, the screen displays a "Stop" button 509, which will correlate to a command to cease charging. The user can, in this example, select this command at any time to cease the current charging cycle, assuming that either the vehicle can self-stop charging or the recharge point can be remotely disabled.

The display also shows a "Set" button 511, which can be used to set any number of levels at which a recharge should cease. In this example, two non-limiting instances of a full percentage (75%) 513 and a drivable distance (173 ml) 515 are shown. By pressing this button, the user can be given an option to select the type of cessation point, and can be given an option to enter a value for the cessation point.

FIG. 5B shows a second example of a smartphone display, in this case for a gasoline powered vehicle. In this example, as with the electric vehicle, the display shows a large indicia of overall fuel level in the center of the display 531. Also, as with the electric display, a current drivable range is shown 517. The time to full 519 can be shown and a maximum vehicle range 521 can also be displayed.

This feature is also equipped with a Stop button 509. In this case, since gasoline powered vehicles cannot typically cause cessation of fuel flow, the stop button may only be enabled if the pump is responsive to commands from the device or the vehicle computing system. A Set button is similarly provided, giving options in this case to set a stop at a fuel level 523 or at a dollar level 527. Other suitable levels may also be implemented, as appropriate and desired.

This illustrative example also shows that a driver alert may be displayed 529. In this example, the option to stop a device may not be present based on pump connectivity, so the display will notify a driver that in 1.5 minutes the desired stop point may be reached. Even if the pump could be stopped by the device or a command from the vehicle, this warning may still be useful and displayed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. A system comprising:
a processor configured to:
responsive to a data request from a wireless device, collect vehicle data corresponding to an ongoing refueling process;
send the data relating to the refueling process to the wireless device, responsive to the collection; and receive a stop request, during refueling, from the wireless device, including a user-defined fuel level and, responsively instruct cessation of a refueling process once the fuel level has been reached.

2. The system of claim 1, wherein the refueling process relates to gasoline refueling.

3. The system of claim 1, wherein the refueling process relates to electric recharging.

4. The system of claim 1, wherein the request is for a present fuel level and the data indicates the present fuel level.

5. The system of claim 1, wherein the request is for a time-until-full and the data indicates the time-until-full.

6. The system of claim 1, wherein the request is for a projected drivable-distance based on current fuel and the data indicates the projected driveable-distance.

7. The system of claim 1, wherein the user-defined fuel level specifies a non-full fuel or charge level at which to stop.

8. The system of claim 1, wherein the user-defined fuel level includes a user-defined total amount of dispensed fuel or power.

9. The system of claim 8, wherein the user-defined fuel level includes a total cost of dispensed fuel or power.

10. A non-transitory computer-readable storage medium, storing instructions that, when executed by a processor, cause the processor to perform the method comprising:

receiving requests, corresponding to one or more aspects of a refueling process, from a wireless device in wireless communication with the processor;

collecting vehicle data corresponding to the one or more aspects of the refueling process responsive to the requests;

responding to the requests by sending the data corresponding to the one or more aspects of the refueling process;

receiving a stop request, including a user specified travelable distance, from the mobile device; and instructing cessation of the refueling process once a projected travelable distance based on a current fuel level reaches the specified travelable distance.

11. The storage medium of claim 10, wherein the stop request is received while refueling is ongoing.

12. A computer-implemented method comprising:

collecting vehicle refueling data, via a vehicle computing system (VCS), responsive to a request from a wireless device in wireless communication with the VCS;

sending the refueling data responsive to the request;

receiving a stop request, including a user-defined stop point, defining a total cost, from the wireless device; and instructing cessation of the refueling process once a total cost of fuel reaches the user-defined total cost.

13. The method of claim 12, wherein the stop request is received while refueling is ongoing.

* * * * *